(12) United States Patent
Jost et al.

(10) Patent No.: US 8,412,012 B2
(45) Date of Patent: Apr. 2, 2013

(54) COMPACT, LOW-COST OUTSIDE PLANT OR INDOOR/OUTDOOR CABLES

(75) Inventors: Stefan Jost, Augsburg (DE); Elmar Staudinger, Augsburg (DE); Peter A. Weimann, Atlanta, GA (US)

(73) Assignee: OFS Fitel, LLC, Norcross, GA (US)

( * ) Notice: Subject to any disclaimer, the term of this patent is extended or adjusted under 35 U.S.C. 154(b) by 0 days.

(21) Appl. No.: 13/328,219

(22) Filed: Dec. 16, 2011

(65) Prior Publication Data

US 2013/0058613 A1    Mar. 7, 2013

Related U.S. Application Data

(60) Provisional application No. 61/531,341, filed on Sep. 6, 2011.

(51) Int. Cl.
*G02B 6/44* (2006.01)

(52) U.S. Cl. ........ 385/100; 385/101; 385/102; 385/103; 385/104; 385/105; 385/106; 385/107; 385/108; 385/109; 385/110; 385/111; 385/112; 385/113; 385/114

(58) Field of Classification Search ........... 385/100–114
See application file for complete search history.

(56) References Cited

U.S. PATENT DOCUMENTS

| | | | |
|---|---|---|---|
| 4,893,893 A | 1/1990 | Claxton et al. | |
| 6,249,629 B1 | 6/2001 | Bringuier | |
| 6,327,409 B1 * | 12/2001 | Chabot et al. | 385/114 |
| 7,272,289 B2 | 9/2007 | Bickham et al. | |
| 7,817,892 B2 | 10/2010 | Konstadinidis et al. | |
| 2010/0278493 A1 * | 11/2010 | Kachmar | 385/110 |
| 2011/0142403 A1 | 6/2011 | Hurley | |

OTHER PUBLICATIONS

Peter A. Weimann and William S. Allen, Performance of Single-Fiber and Multi-Fiber Ultra Bend Insensitive Indoor Optical Drop Cables, IWCS conference. Nov. 2009.

* cited by examiner

*Primary Examiner* — Brian Healy
*Assistant Examiner* — Guy Anderson

(57) ABSTRACT

An optical fiber cable includes an unbuffered optical fiber, a tensile reinforcement member surrounding the unbuffered optical fiber, and a jacket surrounding the tensile reinforcement member. The jacket is suitable for outside plant environment. A water blocking material is placed between the unbuffered fiber and the jacket. The unbuffered optical fiber comprises an ultra bend-insensitive fiber that meets the requirements of ITU-T G.657.B3 and exhibits an additional loss of less than approximately 0.2 dB/turn when the fiber is wrapped around a 5 mm bend radius mandrel. The optical fiber cable also exhibits an additional loss of less than approximately 0.4 dB/km at 1550 nm when the cable is subjected to −20° C. outside plant environment.

16 Claims, 1 Drawing Sheet

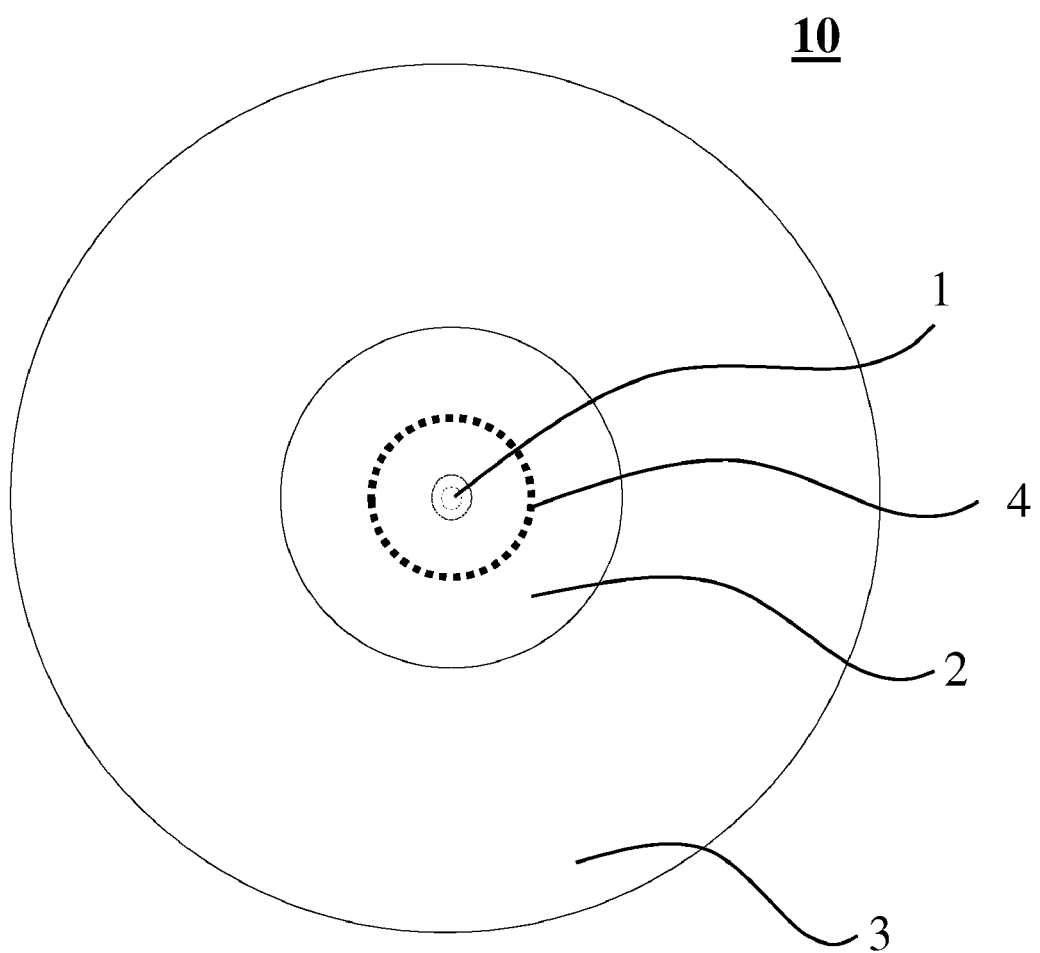

COMPACT, LOW-COST OUTSIDE PLANT OR INDOOR/OUTDOOR CABLES

CROSS REFERENCE TO RELATED APPLICATIONS

This application claims the benefit of U.S. provisional patent application Ser. No. 61/531,341, filed Sep. 6, 2011, having the title "Compact, low-cost outside plant or indoor/outdoor cables incorporating G.657.B3 fiber," which is incorporated herein by reference in its entirety.

TECHNICAL FIELD

This invention generally relates to optical fiber cables, and more particularly, to cables suitable for outside plant or indoor/outdoor applications.

BACKGROUND OF THE INVENTION

Traditional single-mode cables for the outside plant or outdoor/indoor applications have a somewhat complicated structure. In order to ensure low signal attenuation, cable designs must isolate fibers from forces that cause macrobending attenuation. A typical outside plant cable design will enclose the fibers in one or more tubes with water-blocking material, protect those tubes with an outer jacket, and typically use some sort of rigid strength member to limit thermal expansion and contraction of the cable at temperature extremes.

A typical indoor-outdoor style premises drop cable utilizes a tight buffer directly outside the fibers to limit contact between the fiber and the rest of the cable. Like the tube in the outside plant example above, the tight buffer isolates the actual fiber from forces causing macrobending attenuation. However, these approaches require a complicated, costly multi-step process to package the fiber.

BRIEF SUMMARY OF THE INVENTION

Therefore, an objective of the present invention is to provide compact, low-cost optical fiber cables suitable for outside plant or indoor/outdoor applications. According to one embodiment of the present invention, an optical fiber cable is provided. The optical fiber cable includes an unbuffered optical fiber, a tensile reinforcement member surrounding the unbuffered optical fiber, a jacket surrounding the tensile reinforcement member. The jacket is suitable for outside plant environment. A water-blocking material is placed between the unbuffered fiber and the jacket. The unbuffered optical fiber exhibits an additional loss of less than approximately 0.2 dB/turn when the fiber is wrapped around a 5 mm bend radius mandrel, and the optical fiber cable exhibits an additional loss of less than approximately 0.4 dB/km at 1550 nm when the cable is subjected to −20° C. outside plant environment.

According to another embodiment of the present invention, another optical fiber cable is provided. The cable is an outside plant optical fiber cable. The cable includes an unbuffered optical fiber wherein the unbuffered fiber satisfies ITU-T G.657 B3, a layer of yarns surrounding the unbuffered optical fiber, a jacket surrounding the layer of yarns wherein the jacket is suitable for outside plant environment; and a water blocking material between the unbuffered fiber and the jacket.

BRIEF DESCRIPTION OF THE DRAWINGS

Reference will now be made to the accompanying, which is not necessarily drawn to scale, and wherein:

FIG. 1 is a diagram of an illustrative optical fiber cable according to an example embodiment of the present invention.

DETAILED DESCRIPTION

In the following description, similar components are referred to by the same reference numeral to enhance the understanding of the invention through the description of the drawings. Also, unless otherwise explicitly specified herein, the drawings are not drawn to scale.

Although specific features, configurations and arrangements are discussed herein below, it should be understood that such is done for illustrative purposes only. A person skilled in the relevant art will recognize that other steps, configurations and arrangements are useful without departing from the spirit and scope of the invention. Also, if terms are not defined in this specification, those terms are in accordance with definitions and measuring methods of International Telecommunication Union Telecommunication Standardization Sector (ITU-T) G.652 or G.657 standards.

One approach to reduce the complicated, costly multi-step process to package the fiber into a cable structure in the past is the SBJ buffered optical fiber, which is commercially available from OFS Fitel, LLC in Carrollton, Ga. The SBJ buffered optical fiber includes an optical fiber comprising a core, a cladding, and a dual-layer acrylate coating, with an overall diameter of approximately 250 microns, though fibers with other diameters may be used. The optical fiber is enclosed by a thin plastic buffer jacket layer. Interposed between the optical fiber and the buffer jacket layer are a plurality of fibrous polyaramid yarn strands which are strength members for the buffered optical fiber. The final construction has a nominal overall diameter of 900 microns. Details of these buffered optical fibers are disclosed in U.S. Pat. No. 4,893,893.

However, the attenuation performance of the SBJ buffered optical fiber product is poor because they have traditionally only used G.652.D or G.657.A1 fibers, which are sensitive to microbending caused by direct contact with the polyaramid yarn reinforcement. In addition, in order to use those fibers for outside plant or indoor/outdoor applications, those fibers have to be protected by additional components to prevent microbending and provide physical protection in order to ensure that signal attenuation and mechanical reliability are acceptable in service.

Many vendors commercially offer compact, indoor-only cables. For example, OFS offers a compact, indoor-only cable in which multiple optical fibers are placed next to aramid yarns under a jacket, similar in concept to the SBJ product described above. However, these cables are only specified for use over a limited temperature window in indoor applications only; they are not tough enough to be deployed outdoors.

The simplest possible outside plant or indoor/outdoor optical cable must have four elements: an optical fiber for transmission of the signal; an outer jacket to protect the fiber from physical damage during and after installation, as well as the effects if UV radiation; tensile reinforcements, to limit the strain on the fiber during installation and long-term service; and an element with water-blocking functionality, to limit ingress of water if there is damage to the cable jacket, as both the actual glass and the fiber coatings can be damaged by exposure to water. Other components in the cable are just there to prevent microbending and provide physical protection.

Rather than using lots of components to prevent microbending, one embodiment of the present invention allows microbending and uses ultra bend insensitive, ITU G.657.B3 fiber to ensure that signal attenuation is acceptable in service.

Referring to FIG. 1, an optical fiber cable 10 according to one embodiment of the invention is shown. The optical fiber cable 10 includes an unbuffered optical fiber 1, a tensile reinforcement member 2 surrounding the unbuffered optical fiber 1, a jacket 3 surrounding the tensile reinforcement member 2. The jacket 3 is suitable for outside plant environment. A water-blocking material 4 is placed between the unbuffered fiber 1 and the jacket 3. The unbuffered optical fiber 1 exhibits an additional loss of less than approximately 0.2 dB/turn when the fiber 1 is wrapped around a 5 mm bend radius mandrel, and the optical fiber cable 10 exhibits an additional loss of less than approximately 0.4 dB/km at 1550 nm when the cable 10 is subjected to −20° C. outside plant environment.

Preferably, the unbuffered optical fiber 1 is an ultra bend-insensitive single-mode fiber, which exhibits lower additional loss than a traditional fiber when it is wrapped around a mandrel. ITU-T G.657.B3 fiber is the commonly accepted international standard describing requirements for ultra bend-insensitive single-mode fiber.

ITU G.657.B3 defines a particular set of macrobend performance. In particular, at a wavelength of 1550 nm, ITU G.657.B3 requires less than 0.2 dB loss for one full turn around a 5 mm bend radius mandrel. Preferably, the unbuffered optical fiber 1 meets the requirements of ITU-T G.657 B3.

One example of G.657.B3 fibers is EZ Bend fiber, which is commercially available from OFS Fitel, LLC. in Norcross, Ga. The EZ Bend fiber available from OFS Fitel, LLC. uses a dual-trench refractive index profile around the fiber core. Examples of the OFS EZ Bend fiber are disclosed in U.S. Patent Application Publication Nos. 2009/0060437, 2011/0194814, and 2011/0194813 which are incorporated herein by reference in their entireties.

Preferably, the tensile reinforcement member 2 is an aramid yarn. Its light weight, high strength and inherent resistance to flame are ideal for outside plant and indoor/outdoor cable applications. In addition, use of aramid yarn helps termination of the cable. A connector can be "crimped" to the aramid yarn, which allows the yarn to reinforce the connector and prevent users from accidentally pulling the connector off the terminated end of the cable. Another suitable tensile reinforcement member 2 would be a glass thread, a glass yarn strength member, or a twisted glass yarn strength member.

A sufficient amount of the tensile reinforcement member 2 is positioned between the unbuffered optical fiber 1 and the jacket 3 to provide tensile strength required for the resulting cable 10. The sufficient amount of the tensile reinforcement member 2 may be different for different types of the tensile reinforcement member 2. Typical tensile strength required can range from 440N or less for an outdoor/indoor drop cable to about 2600 N for a rugged cable. The cable 10 can be used for applications with wide range of required tensile strength and, preferably, the cable 10 is suitable for lower tensile strength applications.

Material for the jacket 3 is selected to be suitable for outside plant environment. When the cable is used for outdoor applications only, a UV-stabilized, compounded polyethylene jacket may be used. For example, Borstar HE6067 is one suitable resin, commercially available from Borealis Compounds LLC, Port Murray, N.J., USA.

However, when the cable is to be used for outdoor/indoor applications, the jacket 3 is preferably made from flame-retardant, fungus resistant, UV-stabilized low-smoke zero-halogen resin; or from flame-retardant, fungus resistant, UV-stabilized PVC resin. If the cable 10 is intended to be used for indoor/outdoor applications, flame-retardancy, fungus retardancy, and UV-stabilization of the resin for jacket material are important. For example, AlphaGary Megolon 8110LD UV-FG is one suitable resin that is commercially available from AlphaGary Corp. in Leominster, Mass., USA and Melton Mowbray, UK. Other suitable jackets for indoor/outdoor embodiments include PVC, low smoke PVC, fluoropolymers, and flame-retardant polyurethanes, provided these materials are stabilized against degradation by UV light and resist fungal growth.

If low jacket surface friction is desired for cables installed in ducts by air-blowing or pushing, other materials that may be used include impact-modified polypropylenes, or nylon resins such as nylon 12, nylon 11 or nylon 6.10. Inorganic fillers such as talc, calcium carbonate or mica may also be added to the jacket to reduce jacket shrinkage and surface friction. The jacket thickness will depend on the application of the cable 10.

The water-blocking material 4 placed between the unbuffered fiber 1 and the jacket 3 may be a dry waterswellable material coated on a thread, on a yarn, on or in a tape, or scattered as loose powder. Depending on the type of the water-blocking material 4 used and the particular application of cable 10, the amount of the water-blocking material 4 needed may be different. Sufficiency of amount of water-blocking material 4 may be determined using relevant water penetration tests. Example of such tests are FOTP-82 for the US and IEC 60794-1-2 F5 for Europe.

In preferred embodiments, the tensile reinforcement member 2 is coated with the water blocking material 4 because the tensile reinforcement member 2 (such as yarns) is an essential part of the cable structure. Therefore, the cable has only three components: a ultra bend-insensitive single-mode fiber; reinforcing yarns with a waterswellable finish; and an outer jacket—which, together provide the essential, minimal elements of an optical cable. More preferably, substantially all of the water-blocking material 4 between the unbuffered fiber 1 and the jacket 3 is applied to the tensile reinforcement member 2. For example, Teijin Twaron Type D3052 waterswellable aramid yarn, available from Teijin, Conyers, Ga., USA is a suitable reinforcement member 2 coated with suitable water-blocking material 4 for the cable 10.

EXAMPLE

An optical fiber cable according to an embodiment of the present invention includes a 250 μm colored optical fiber, aramid yarns coated with water-blocking material, and a flame-retardant outer jacket. The example cable is for an indoor-outdoor cable with a 4.8 mm diameter. OFS EZ Bend fiber, an ITU G.657.B3 fiber, is used for the cable. The example cable satisfies IEC 60332-1 flame spread requirements and meets a typical European standard of a "1W" tensile rating, which requires approximately 0.4% fiber strain at a load (in kgf) that is equivalent to the weight of one kilometer of cable (in kg). One or both ends of the cable can be terminated as a pigtail or jumper.

If the example cable is deployed as a bulk cable or pigtail, the use of 250 micron fiber makes splicing and termination in the field convenient for the installer. All the installer has to do is to remove the jacket and cut away the aramid yarn, and the fiber is ready to splice. If a tight buffer or an easy-strip buffer is used contrary to the unbuffered fiber used in the inventive cable, the installer would need to remove the buffer coating with appropriate tools and clean the fiber prior to splicing.

Because the fiber inside the cable is a standard 250 micron coated optical fiber, without a buffer, it is easy to store very long lengths of fiber slack in standard splice trays designed for 250 micron fiber. If the network operator uses architecture where the cable is spliced at the customer premises, a "Customer Splice Point" box can be extremely small, reducing cost and improving aesthetics of the installation at the customer's residence or business.

Comparison I

An optical fiber cable according to an embodiment of the present invention is compared with a prior art cable. Both the inventive cable and the prior art cable have the same cable structure as shown in Example above. Both cables are 4.8 mm diameter, single-fiber drop cables for FTTH. The only difference between the cables is the fibers in the cables.

The composition of the inventive cable is G.657.B3 compliant OFS EZ Bend fiber, four ends Teijin Twaron Type D3052 waterswellable aramid yarn with linear density of 2420 dTex, and outer jacket of AlphaGary Megolon 8110-LD UV BK non-halogen jacketing.

The composition of the prior cable is G.657.A1 compliant OFS AllWave FLEX ZWP fiber, four ends Teijin Twaron Type D3052 waterswellable aramid yarn with linear density of 2420 dTex, and outer jacket of AlphaGary Megolon 8110-LD UV BK non-halogen jacketing.

The tables below show attenuation of the inventive cable with the EZ Bend fiber and the prior art cable with AllWave FLEX ZWP fiber, respectively.

TABLE I

Attenuation of a cable with an EZ Bend fiber

| Attenuation | Initial 23C | 1st-10 | 1st 60 | 2nd-10 | 2nd 60 | 3rd-10 | 3rd 60 | −20C | 70C | Final 23C |
|---|---|---|---|---|---|---|---|---|---|---|
| 1310 | 0.3237 | 0.3223 | 0.3281 | 0.324 | 0.3288 | 0.3207 | 0.3253 | 0.3222 | 0.3302 | 0.3255 |
| 1550 | 0.1876 | 0.1901 | 0.1925 | 0.2889 | 0.1929 | 0.2727 | 0.1934 | 0.3365 | 0.1926 | 0.1931 |
| 1625 | 0.2012 | 0.2016 | 0.2337 | 0.6772 | 0.2101 | 0.627 | 0.2084 | 0.7326 | 0.2061 | 0.2018 |

| Added Loss | | 1st-10 | 1st 60 | 2nd-10 | 2nd 60 | 3rd-10 | 3rd 60 | −20C | 70C | Final 23C |
|---|---|---|---|---|---|---|---|---|---|---|
| 1310 | | −0.0014 | 0.0044 | 0.0003 | 0.0051 | −0.003 | 0.0016 | −0.0015 | 0.0065 | 0.0018 |
| 1550 | | 0.0025 | 0.0049 | 0.1013 | 0.0053 | 0.0851 | 0.0058 | 0.1489 | 0.005 | 0.0055 |
| 1625 | | 0.0004 | 0.0325 | 0.476 | 0.0089 | 0.4258 | 0.0072 | 0.5314 | 0.0049 | 0.0006 |

TABLE II

Attenuation of a cable with an AllWave FLEX ZWP fiber

| Attenuation | Initial 23C | 1st-10 | 1st 60 | 2nd-10 | 2nd 60 | 3rd-10 | 3rd 60 | −20C | 70C | Final 23C |
|---|---|---|---|---|---|---|---|---|---|---|
| 1310 | 0.3299 | 0.324 | 0.3316 | 0.3299 | 0.3316 | 0.329 | 0.3297 | 0.3322 | 0.3313 | 0.3292 |
| 1550 | 0.1695 | 0.1794 | 0.1836 | 0.3632 | 0.1801 | 0.3565 | 0.1838 | 0.7282 | 0.1853 | 0.1802 |
| 1625 | 0.1856 | 0.1829 | 0.1946 | 0.9363 | 0.1904 | 0.786 | 0.1895 | 1.0341 | 0.1916 | 0.1929 |

| Added Loss | | 1st-10 | 1st 60 | 2nd-10 | 2nd 60 | 3rd-10 | 3rd 60 | −20C | 70C | Final 23C |
|---|---|---|---|---|---|---|---|---|---|---|
| 1310 | | −0.0059 | 0.0017 | 0 | 0.0017 | −0.0009 | −0.0002 | 0.0023 | 0.0014 | −0.0007 |
| 1550 | | 0.0099 | 0.0141 | 0.1937 | 0.0106 | 0.187 | 0.0143 | 0.5587 | 0.0158 | 0.0107 |
| 1625 | | −0.0027 | 0.009 | 0.7507 | 0.0048 | 0.6004 | 0.0039 | 0.8485 | 0.006 | 0.0073 |

According to Tables I and II, attenuation and added loss of the inventive cable with the EZ Bend fiber are significantly less than ones of the prior art cable with AllWave FLEX ZWP fiber. Tables I and II show superior performance of the inventive cable with the EZ Bend fiber under a wide range of temperature cycles that the cable is likely to be subjected to for outside plant/outdoor application.

The above comparison compares 4.8 mm diameter, single-fiber drop cables for FTTH. 4.8 mm is a common diameter for a "ruggedized" optical drop cable for FTTH as this is roughly the same size as Category 5 copper datacom wire. However, the inventive cable can be applied to wide range of cable diameters. For example, the inventive cable may have cable diameter of any size from 900 microns to 4.8 mm and beyond. For a single-fiber cable, preferred cable diameters may be 2.0 mm, 2.4 mm, 3.0 mm or 4.8 mm to match up with the sizes of typical commercial single-fiber optical connectors. For multi-fiber cables, preferred cable diameter ranges between 2 mm (for the smallest 2f cable) and 8 mm for multi-fiber cables. For cases where more than 12 fibers are used, the fibers may be identified by dash-marks, or bundled into units using color-coded polyester bundle threads.

Comparison II

Next, the sample inventive cable disclosed in Example above was subjected to the ICEA-S-730 Premises Simulated Installation Test. Under the test. The sample inventive cable was subjected to the following conditions: ten 90° corner bends (1 mm radius) with no load, one 90° corner bends (1 mm radius) with 2 kg load, one 90° corner bend (1 mm radius) with rated residual load (30% of maximum tensile load during installation), two 10 mm diameter mandrel wraps, and thirty T25 round-crown cable staples on a pine (or similar) board.

Then, results were compared with results obtained with a buffered optical fiber cable. The sample inventive cable uses a 250 μm OFS EZ-Bend fiber (unbuffered), and the comparative cable uses a Nylon buffered OFS EZ-Bend fiber (buffered).

The following table shows comparison between the inventive unbuffered optical fiber cable and the comparative buffered optical fiber. Both of the cables are 4.8 mm LSZH cables. All measurements are at 1550 nm.

TABLE III

| Added loss of buffered and unbuffered EZ-bend fiber cables | | |
| --- | --- | --- |
| Test | Buffered | Unbuffered |
| 10 mm Diameter Mandrel, loss/turn | 0.06 dB | 0.04 dB |
| 6 mm Diameter Mandrel, loss/turn | 0.06 dB | 0.05 dB |
| Corner Bend, 2 kg load, loss | 0.009 dB | 0.015 dB |
| Corner Bend, 14 kg load, loss | 0.016 dB | 0.030 dB |
| Premises Installation Simulation, loss | 0.141 dB | 0.136 dB |

According to Table III, the inventive unbuffered optical fiber cable exhibits low attenuation essentially indistinguishable to that of the comparative buffered optical fiber in industry-standard bending and installation simulation tests.

The inventive unbuffered cable is designed to be used in the outside plant environment. All cables intended for outdoor service must be able to function with minimal loss throughout the anticipated outdoor service temperature window. For example, such anticipated outdoor service temperature window is −10° C. to 60° C. for the UK, and typically −40° C. to 70° C. for the US. For indoor only cables, the temperature range is restricted to much a narrower range because anticipated indoor service temperature window is much narrower than that of the outdoor service.

Lower loss is almost always preferred in any fiber system because lower loss means longer reach, especially in passive optical networking, where a signal is launched at a central office then travels several kilometers to the end point. For example, pending standard for MDU drop cable allows up to 0.4 dB/km added loss at 1550 nm during temperature cycling. At −20° C., a cable with G.657.B3 fiber passes this requirement; however, a cable with G.657.A1 fiber fails. The cable with G.657.A1 fiber is expected not to meet <0.4 dB added at −20° C.

The embodiments of the present invention mainly show cables with a single fiber. However, the concept of the invention can be easily extended to multi-fiber cables such as multi-fiber drop cables without undue experiments.

Minimum number of fibers according to the present invention is one. However, the cable may include plurality of fibers. For example, the cable may have 2, 4, 8, 12, 24 or 48 fibers in a cable. 2 and 4 fibers are common in Europe. When number of fibers is greater than 12, dash-marked fiber or color-coded polyester bundle threads maybe used to bundle optical fibers into one or more bundles.

While certain embodiments of the invention have been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the invention, including the best mode, and also to enable any person skilled in the art to practice certain embodiments of the invention, including making and using any devices or systems and performing any incorporated methods. The patentable scope of certain embodiments of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An optical fiber cable consisting essentially of:
   one or more unbuffered optical fibers;
   a tensile reinforcement member surrounding the one or more unbuffered optical fibers;
   a jacket surrounding the tensile reinforcement member wherein the jacket is suitable for outside plant environment; and
   a water-blocking material between the one or more unbuffered fibers and the jacket;
   wherein the one or more unbuffered optical fibers exhibit an additional loss of less than approximately 0.2 dB/turn when the fiber is wrapped around a 5 mm bend radius mandrel, and the optical fiber cable exhibits an additional loss of less than approximately 0.4 dB/km at 1550 nm when the cable is subjected to −20° C. outside plant environment.

2. The optical cable of claim 1, wherein the one or more unbuffered optical fibers meet the requirements of ITU-T G.657.B3.

3. The optical cable of claim 2, wherein the unbuffered optical fiber has a core and the unbuffered optical fiber uses dual-trench refractive index profile around the core.

4. The optical cable of claim 2, wherein the unbuffered optical fiber is an ultra bend-insensitive single-mode fiber.

5. The optical cable of claim 1, wherein the tensile reinforcement member is an aramid yarn.

6. The optical cable of claim 1, wherein the tensile reinforcement member is coated with the water-blocking material.

7. The optical cable of claim 6, wherein the tensile reinforcement member is a glass thread, a glass yarn strength member, or a twisted glass yarn strength member.

8. The optical cable of claim 6, wherein substantially all of the water-blocking material between the one or more unbuffered fibers and the jacket is applied to the tensile reinforcement member.

9. The optical cable of claim 1, wherein the tensile reinforcement member surrounding the one or more unbuffered optical fibers is sufficient to sustain a required tensile strength of the cable.

10. The optical cable of claim 1, wherein the jacket is made from polyethylene resin.

11. The optical cable of claim 1, wherein the jacket is made from flame-retardant, fungus resistant, UV-stabilized low-smoke zero-halogen resin.

12. The optical cable of claim 1, wherein the jacket is made from flame-retardant, fungus resistant, UV-stabilized PVC resin.

13. The optical cable of claim 1, wherein the water blocking material is a dry waterswellable material coated on a thread, on a yarn, on or in a tape, or scattered as loose powder.

14. The optical cable of claim 1, wherein the diameter of the cable is between approximately 2.0 mm and approximately 5 mm for a single-fiber cable.

15. The optical cable of claim 1, wherein the diameter of the cable is between approximately 2.0 mm and approximately 8 mm for a multi-fiber cable.

16. An outside plant optical fiber cable comprising:
an unbuffered optical fiber wherein the unbuffered fiber satisfies ITU-T G.657.B3;
a layer of yarns surrounding the unbuffered optical fiber;
a jacket surrounding the layer of yarns wherein the jacket is suitable for outside plant environment; and
a water-blocking material between the unbuffered fiber and the jacket.

* * * * *